June 30, 1959     K. J. KOLLMANN     2,892,649
JOINT FOR SEWER SNAKES
Filed May 15, 1956

INVENTOR.
KARL J. KOLLMANN
BY

United States Patent Office 2,892,649
Patented June 30, 1959

2,892,649
JOINT FOR SEWER SNAKES
Karl J. Kollmann, Erie, Pa.
Application May 15, 1956, Serial No. 584,939
5 Claims. (Cl. 287—103)

This invention relates to connectors for shafts and more particularly to connectors for connecting sewer rods.

This application is a continuation in part of application, Serial No. 162,528, filed May 17, 1950, now Patent 2,755,115, July 17, 1956.

The said application discloses an improved method of attaching two sewer snake members together. The present invention discloses a particular adaptation of an improved connection utilizing certain subject matter of the connector disclosed in the prior application.

More specifically, it is an object of this invention to provide a connector for sewer rods which is simple in construction, economical to manufacture, and simple and efficient to use.

Another object of the invention is to provide an improved method for attaching two sewer rods together.

A further object of the invention is to provide an improved method for attaching a rod to a connecting member.

With the above and other objects in view, the present invention consists of the combination and arrangement of parts hereinafter more fully described, illustrated in the accompanying drawing and more particularly pointed out in the appended claims, it being understood that changes may be made in the form, size, proportions, and minor details of construction without departing from the spirit or sacrificing any of the advantages of the invention.

Figure 1:
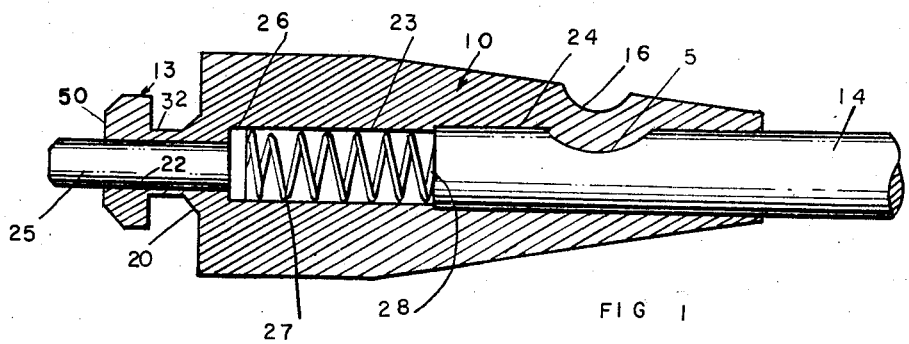
Fig. 1 is a cross sectional view of one of the coupling members.
Figure 2:
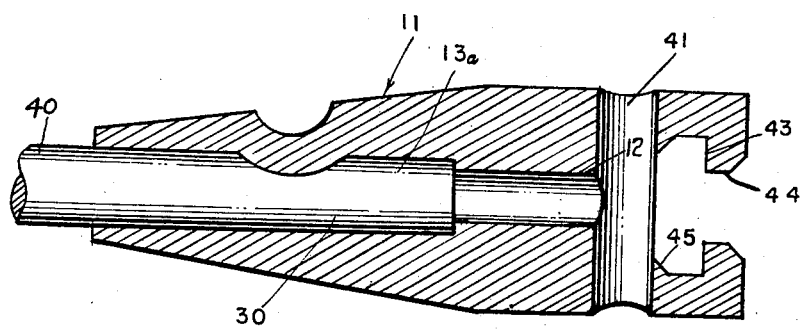
Fig. 2 is a cross sectional view of the coupling member which is adapted to mate with the coupling member shown in Fig. 1.
Figure 3:
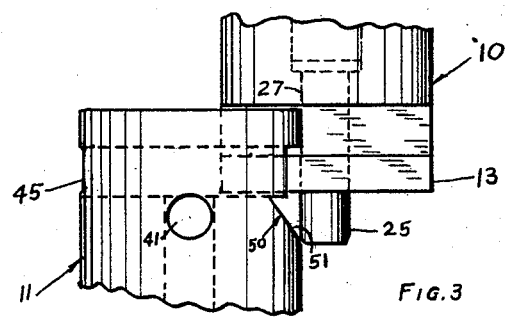
Fig. 3 is a side view of the coupling members shown in Figs. 1 and 2.

Now with more specific reference to the drawing, a coupling member 10 is shown adapted to mate with and be connected to a coupling member 11. The member 10 has a head 13 integrally connected thereto by means of a neck portion 32. The coupling member or body 10 has a bore 22 therethrough which is counterbored at 23 and the counterbore 23 is itself counterbored at 24, forming a second counterbore.

A headed pin 25 is disposed in the bore 22 and a head 26 of the headed pin 25 rests in the first counterbore 23 with a spring 27 engaging the head 26 of the pin 25. An outer end 28 of the spring 27 is engaged by a rod 14. The rod 14 has a recess 5 formed therein and the material of the body 10 is peened down into the recess 5 at 16.

The coupling member or body portion 11 has a bore 12 therein counterbored at 13a which receives an end 30 of a rod 40. A transverse bore 41 is formed in the body 11 which intersects the bore 12. A T-shaped slot 43 is formed in the other end of the body 11 which has an open portion 44 and an enlarged portion 45. The T-slot 43 is adapted to receive the head 13 of the body member 10; that is, when the pin 25 is pushed up until its end is flush with a surface 50, the head 13 will slide laterally through the T-slot 43 and when the pin 25 is released, the spring 27 will urge it to enter the bore 41 where the T-slot 43 intercepts the bore 41.

In order for the pin 25 to be retracted during assembly without applying pressure thereto, the side of the coupling member 10 has the notched surface 50 which inclined inwardly and toward the portion 45 of the T-slot 43. This forms a flat surface 51 for the pin 25 to slide on. Thus, when the head 13 is slid laterally into the T-slot 43, the end of the pin 25 slides up the surface 51 and is pushed until the end of the pin 25 is flush with the end of the head member 13 so that the T can be slid laterally into the slot 43.

The foregoing specification sets forth the invention in its preferred practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A separable connector for two rods comprising two body members, an axial bore formed in each said body member, said bores in said two body members being in axial alignment and communicating with each other, a pin in one said bore in one said body member, a compression spring in said bore engaging said pin, one said rod inserted in the other end of said bore engaging the other end of said spring, and a notch formed in one side of each said rod prior to insertion thereof into said bore, the material of said body member being forced into said notch in said rods.

2. The connector recited in claim 1 wherein said bore in one said body member has a counterbore therein, said pin having a head on one end thereof disposed in said counterbore, said means to connect said body members comprising a head on one end of one said body member connected by a neck portion, said pin extending through said neck portion and said head and out one end thereof, and a transverse T-shaped slot in one end of said other body member, said head of said headed body member being adapted to be received in said T-shaped slot, and means on said other body member to receive one end of said pin.

3. In combination, a coupling and two rods adapted to be coupled thereby comprising a first and a second coupling member, each having two ends, means on one end of each member attaching it to one said rod, a transversely extending generally T-shaped slot in the other end of said first coupling member, a transversely extending aperture in said first member disposed substantially at right angles to said T-shaped slot, said aperture communicating with said slot, the other end of said second coupling member having a male member having a head connected to one end thereof by a neck portion, said head having two flat shoulders extending outwardly from said neck portion and generally perpendicular to said neck portion and disposed in said slot, said T-shaped slot having two flat shoulders disposed generally perpendicular to the longitudinal axis thereof engaging said head member shoulders when said head is disposed in said slot, means to lock said head in said slot against lateral sliding, said locking means comprising a centrally disposed axial bore in said male member extending through said head on said male member, and a locking pin disposed in said axial bore and extending into said transverse aperture in said first member, said transverse aperture being adapted to receive a wedge shaped pin whereby said locking pin may be forced out of said transverse aperture and said head slid laterally in said slot to remove it therefrom and thereby separate said rods, said axial bore in said male member being counterbored at the end thereof remote from said head thereon and said locking pin having a head thereon disposed in said counterbore, and a spring disposed in said counterbore adapted to urge said locking pin into said transverse aperture in said first member, said head adapted to engage said male member at the end of said counterbore adjacent said head to limit the movement of the pin therein whereby said pin has one end terminating in spaced relation to one wall of said transverse aperture, said means to connect a sewer rod thereto comprising a notch in one side of said rod, said notch being formed in said sewer rod prior to insertion thereof into said first member, the material of said first member being peened into said notch whereby said rod is held in said first member.

4. The combination recited in claim 3 wherein said notch is formed in the side of said first coupling member adjacent the end of said T-shaped slot, one edge of said notch being flat and extending toward said T-shaped slot and inwardly, said side of said notch being adapted to guide said locking pin to compress said spring to move said headed member into said T-shaped slot.

5. In combination, a coupling and two rods adapted to be coupled thereby comprising a first and a second coupling member, each having two ends, means on one end of each member attaching it to one said rod, a transversely extending generally T-shaped slot in the other end of said first coupling member, a transversely extending aperture in said first member disposed substantially at right angles to said T-shaped slot, said aperture communicating with said slot, the other end of said second coupling member having a male member having a head connected to one end thereof by a neck portion, said head having two flat shoulders extending outwardly from said neck portion and generally perpendicular to said neck portion and disposed in said slot, said T-shaped slot having two flat shoulders disposed generally perpendicular to the longitudinal axis thereof engaging said head member shoulders when said head is disposed in said slot, means to lock said head in said slot against lateral sliding, said locking means comprising a centrally disposed axial bore in said male member extending through said head on said male member, a locking pin disposed in said axial bore and extending into said transverse aperture in said first member, a spring adapted to urge said locking pin into said transverse aperture in said first member, and a notch formed in the side of said first coupling member adjacent the end of said T-shaped slot, one edge of said notch being flat and extending toward said T-shaped slot and inwardly, said side of said notch being adapted to guide said locking pin to compress said spring to move said headed member into said T-shaped slot.

References Cited in the file of this patent

UNITED STATES PATENTS

| | | |
|---|---|---|
| 557,037 | Toquet | Mar. 24, 1896 |
| 742,598 | Costello et al. | Oct. 27, 1903 |
| 1,169,642 | Heeter | Jan. 25, 1916 |
| 2,755,115 | Kollmann | July 17, 1956 |